(12) United States Patent
Kusakabe

(10) Patent No.: US 8,484,330 B2
(45) Date of Patent: Jul. 9, 2013

(54) INFORMATION PROCESSING SYSTEM AND CONTROL METHOD THEREOF

(75) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 12/696,887

(22) Filed: Jan. 29, 2010

(65) Prior Publication Data
US 2010/0223318 A1 Sep. 2, 2010

(30) Foreign Application Priority Data
Mar. 2, 2009 (JP) ................................. 2009-048273

(51) Int. Cl.
*G06F 15/173* (2006.01)

(52) U.S. Cl.
USPC ........................... 709/223; 709/203; 358/1.15

(58) Field of Classification Search
USPC ......... 709/223, 224, 203, 217, 219; 358/1.15, 358/400, 402, 448
See application file for complete search history.

(56) References Cited

U.S. PATENT DOCUMENTS

| | | | |
|---|---|---|---|
| 6,848,081 B1 | 1/2005 | Yoda et al. | |
| 7,880,905 B2 * | 2/2011 | Sato | 358/1.13 |
| 8,407,613 B2 * | 3/2013 | Hope | 715/769 |
| 2003/0208564 A1 * | 11/2003 | Miyake et al. | 709/219 |
| 2003/0208565 A1 * | 11/2003 | Nishihara et al. | 709/219 |
| 2006/0290972 A1 * | 12/2006 | Izumisawa et al. | 358/1.15 |
| 2007/0002389 A1 * | 1/2007 | Suehiro | 358/401 |
| 2007/0185974 A1 * | 8/2007 | Kawasaki | 709/217 |
| 2007/0206088 A1 * | 9/2007 | Mizunashi et al. | 348/14.01 |
| 2007/0268906 A1 * | 11/2007 | Shozaki et al. | 370/392 |
| 2007/0273933 A1 * | 11/2007 | Tomita | 358/448 |
| 2008/0062471 A1 | 3/2008 | Matsuda | |
| 2008/0089341 A1 * | 4/2008 | Inui | 370/392 |
| 2008/0208937 A1 * | 8/2008 | Yukumoto | 707/206 |
| 2008/0218787 A1 * | 9/2008 | Izumisawa | 358/1.15 |
| 2010/0138783 A1 * | 6/2010 | Sawada et al. | 715/808 |
| 2010/0231969 A1 * | 9/2010 | Tomita | 358/1.15 |
| 2011/0299115 A1 * | 12/2011 | Toda et al. | 358/1.15 |
| 2012/0079064 A1 * | 3/2012 | Fukushima | 709/217 |
| 2012/0293836 A1 * | 11/2012 | Hiraike | 358/1.15 |

FOREIGN PATENT DOCUMENTS

| | | |
|---|---|---|
| CN | 1893505 A | 1/2007 |
| JP | 2000-354124 A | 12/2000 |

OTHER PUBLICATIONS

Chinese Office Action issued on Jun. 2, 2012, in counterpart Chinese application No. 201010123040.7.
Chinese Office Action issued on Sep. 21, 2011, in counterpart application 201010123040.7.

* cited by examiner

*Primary Examiner* — Lashonda Jacobs
(74) *Attorney, Agent, or Firm* — Fitzpatrick, Cella, Harper & Scinto

(57) ABSTRACT

A transmission destination when transmitting data stored in the first information processing apparatus to the second information processing apparatus is registered in the first information processing apparatus. When the registered transmission destination has a transfer setting of transferring data transmitted to the transmission destination, the first information processing apparatus displays, in association with a button for transmission to the transmission destination, information representing the transfer destination of data transferred in accordance with the transfer setting.

12 Claims, 11 Drawing Sheets

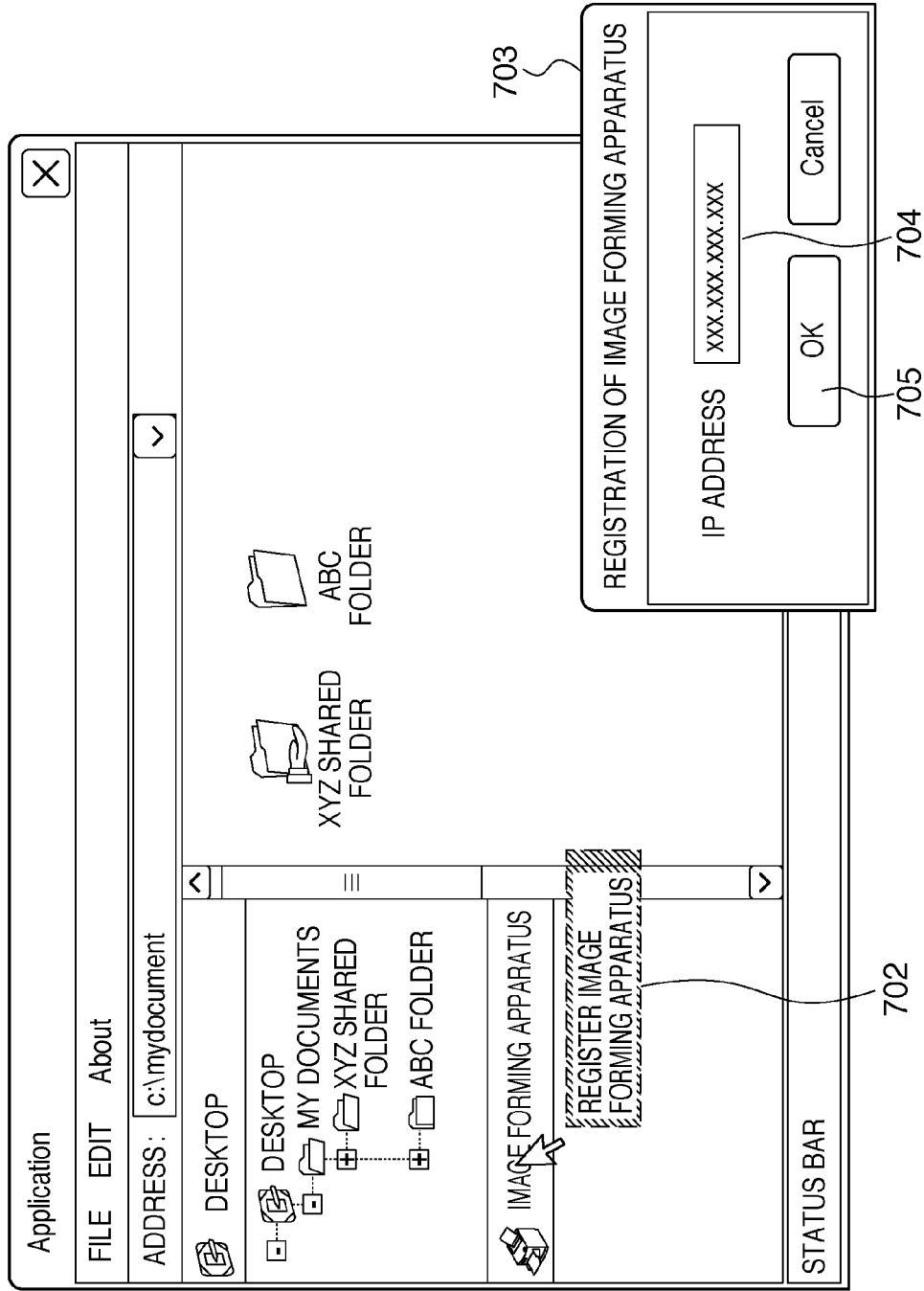

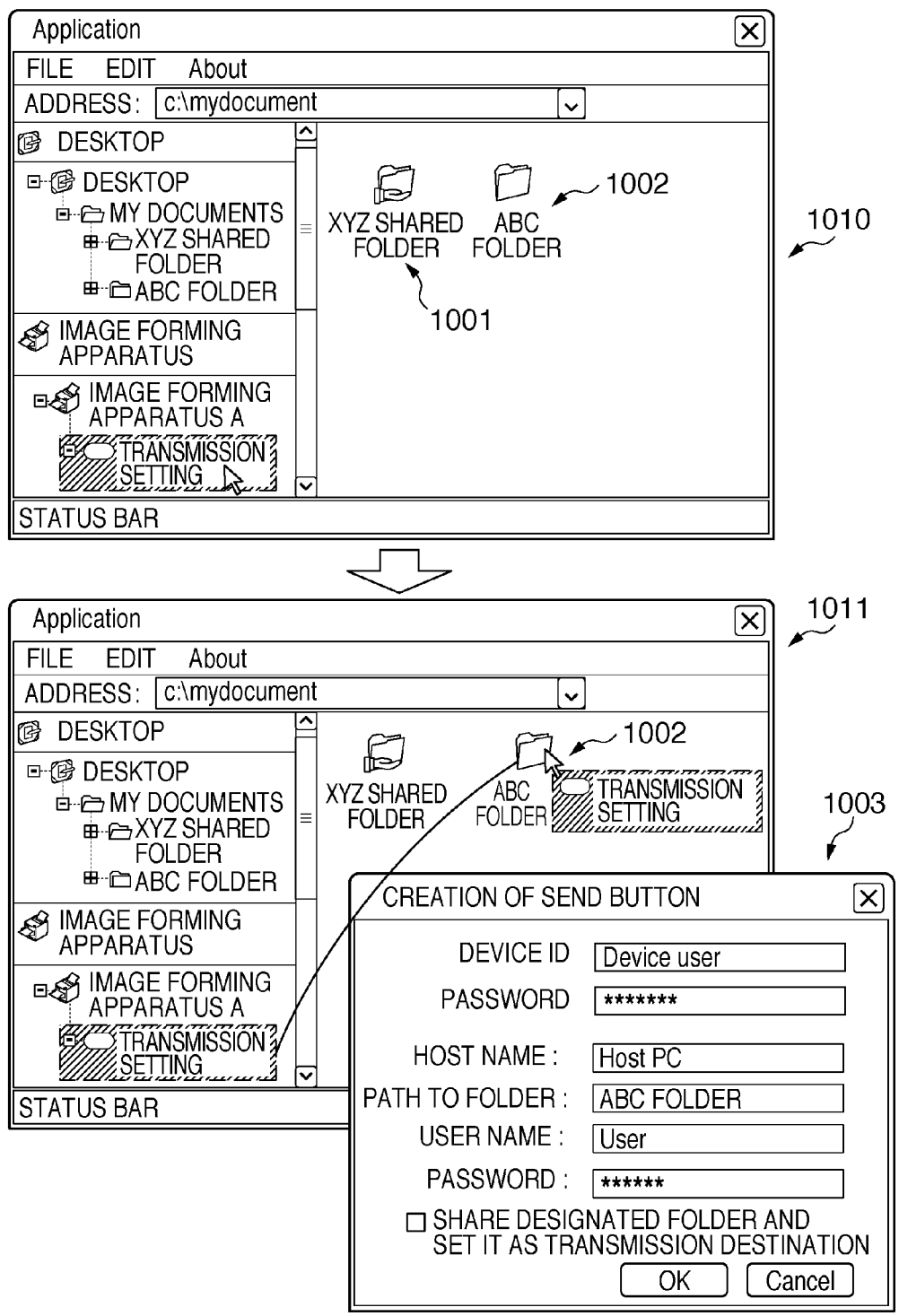

INFORMATION PROCESSING SYSTEM AND CONTROL METHOD THEREOF

BACKGROUND OF THE INVENTION

1. Field of the Invention

The present invention relates to an information processing system and a control method thereof and, more particularly, to an information processing system capable of transmitting data from the first information processing apparatus to the second information processing apparatus, and a control method thereof.

2. Description of the Related Art

Multi-function peripherals (MFPs) having a printer function, facsimile function, scanner function, and the like are widely used in an office and the like. The MFP has even a storage function capable of storing image data as an image file. The MFP can transmit an image file to an information processing apparatus such as a PC.

Japanese Patent Laid-Open No. 2000-354124 discloses a method of receiving image data by a registration system such as a PC from an MFP and transferring the received image data within the registration system. In this case, a transfer profile is set to designate a database serving as a transfer destination. When the user manipulates a button displayed on the operation unit of the MFP, image data is transmitted to the registration system. The image data is transferred to a database designated by the set transfer profile.

Assume that a folder managed in a PC is registered as a transmission destination when transmitting an image file from an MFP to a PC. When the folder has a transfer setting of transferring a file input to the folder, an image file transmitted from the MFP to the PC is transferred to a predetermined transfer destination in accordance with the transfer setting.

The user who manipulates the MFP can recognize that an image file will be transmitted to the PC, but knows neither that the image file transmitted to the PC will be further transferred nor the transfer destination. An image file may be transferred to a location the user of the MFP does not intend, and confidential information may be leaked.

SUMMARY OF THE INVENTION

The present invention has been made to overcome the conventional drawbacks, and has as its object to provide a mechanism of notifying the user of the first information processing apparatus of a transfer destination when data transmitted from the first information processing apparatus to the second information processing apparatus is to be transferred to another storage location.

One aspect of the present invention provides an information processing system capable of transmitting data from a first information processing apparatus to a second information processing apparatus, the system comprising: a registration unit which registers, in the first information processing apparatus, a transmission destination when transmitting data stored in the first information processing apparatus to the second information processing apparatus; and a display control unit which, when the transmission destination registered by the registration unit has a transfer setting of transferring data transmitted to the transmission destination, causes the first information processing apparatus to display, in association with a button for transmission to the transmission destination, information representing a transfer destination of data transferred in accordance with the transfer setting.

Another aspect of the present invention provides a method of controlling an information processing system capable of transmitting data from a first information processing apparatus to a second information processing apparatus, the method comprising the steps of: registering, in the first information processing apparatus, a transmission destination when transmitting data stored in the first information processing apparatus to the second information processing apparatus; and when the transmission destination registered in the registering step has a transfer setting of transferring data transmitted to the transmission destination, causing the first information processing apparatus to display, in association with a button for transmission to the transmission destination, information representing a transfer destination of data transferred in accordance with the transfer setting.

The present invention can provide a mechanism of notifying the user of the first information processing apparatus of a transfer destination when data transmitted from the first information processing apparatus to the second information processing apparatus is to be transferred to another storage location.

Further features of the present invention will become apparent from the following description of exemplary embodiments (with reference to the attached drawings).

BRIEF DESCRIPTION OF THE DRAWINGS

FIGS. 7A and 7B are views exemplifying UI windows in the PC according to the embodiment;

FIGS. 10A and 10B are views exemplifying a UI set according to the flowchart of FIG. 8.

DESCRIPTION OF THE EMBODIMENTS

Preferred embodiments of the present invention will be described in detail below with reference to the accompanying drawings. The following embodiments do not limit the scope of the present invention, and not all combinations of features set forth in the embodiments are essential in solving means of the present invention.

Figure 1:
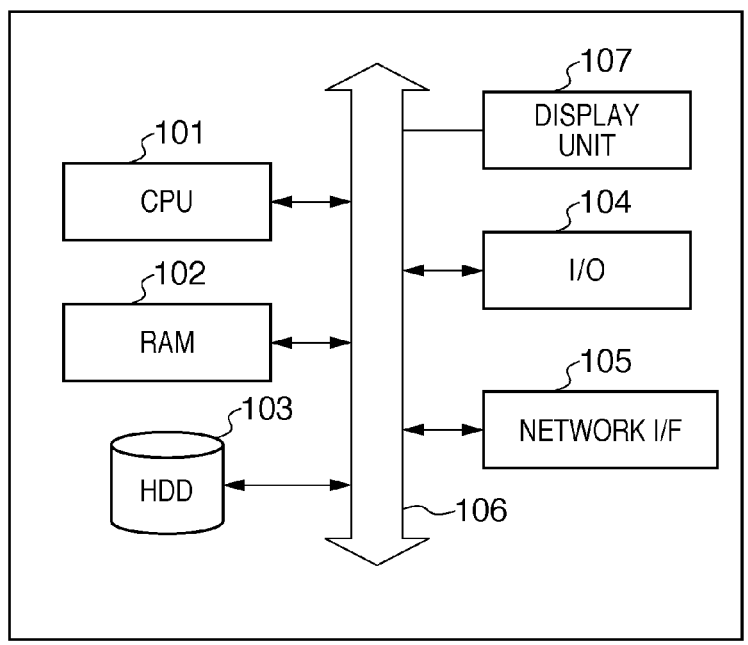
FIG. 1 is a block diagram showing the hardware configuration of an information processing apparatus (PC) according to an embodiment of the present invention.

FIG. 1 is a block diagram showing the hardware configuration of an information processing apparatus (PC) according to an embodiment of the present invention. The PC is connected to a multi-function peripheral (MFP: to be described later) via a network (see FIG. 3).

A CPU 101 executes programs such as an OS and applications loaded from an HDD 103 serving as a storage medium to a RAM 102, implementing an application arrangement in FIG. 2 and the sequences of flowcharts to be described later. The CPU 101 comprehensively controls hardware components connected to a system bus 106. The RAM 102 functions as a main memory, work area, and the like for the CPU 101. An I/O 104 controls key inputs from a keyboard and pointing device (neither is shown). A network interface 105 controls exchange of signals between various devices connected via a network. A display unit 107 displays a user interface, various data, messages, and the like.

Figure 2:
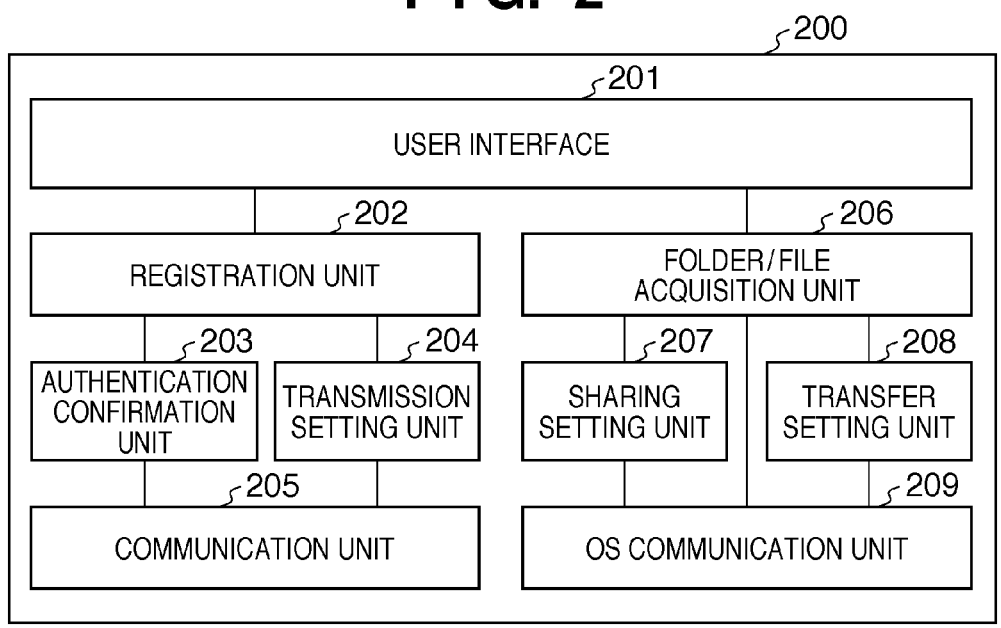
FIG. 2 is a block diagram for explaining the arrangement of an application in the PC according to the embodiment.

FIG. 2 is a block diagram for explaining the arrangement of an application in the PC according to the embodiment.

Reference numeral 200 denotes an entire application according to the embodiment. A user interface (UI) 201 provides the GUI of the application 200. A registration unit 202 registers an MFP capable of transferring an image file to the PC. An authentication confirmation unit 203 authenticates an MFP registered in the registration unit 202. A transmission setting unit 204 makes a setting of transmitting various data to the MFP registered in the registration unit 202. A communication unit 205 exchanges data with the MFP via the network. The user interface 201 stores an MFP registered by the registration unit 202 and displays it on the display unit 107. The user interface 201 displays, on the display unit 107, folders and files on the OS that are acquired from a folder/file acquisition unit 206. The registration unit 202 manages the authentication confirmation unit 203 for registering an MFP and the transmission setting unit 204 for registering a transmission setting in the MFP. The authentication confirmation unit 203 connects the application and MFP and authenticates the MFP via the communication unit 205. The transmission setting unit 204 creates data for creating a transmission setting for the MFP via the communication unit 205. The communication unit 205 communicates with the MFP via the network interface 105 in FIG. 1.

The folder/file acquisition unit 206 acquires, via an OS communication unit 209, folder/file information set by the OS in the HDD 103. A sharing setting unit 207 acquires, via the OS communication unit 209, sharing information set by the OS for a folder in the HDD 103, and shares a folder in the HDD 103. The set/acquired sharing information is reflected on the user interface 201 via the folder/file acquisition unit 206. A transfer setting unit 208 makes a transfer setting of transferring a file from a folder acquired by the folder/file acquisition unit 206 to another folder.

Figure 3:
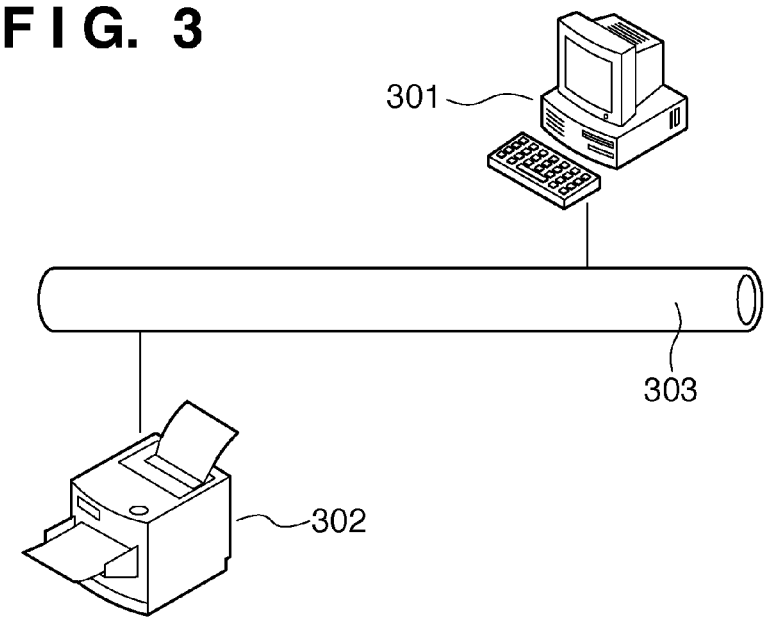
FIG. 3 is a view for explaining the configuration of an information processing system according to the embodiment.

FIG. 3 is a view for explaining the configuration of an information processing system according to the embodiment.

Referring to FIG. 3, an information processing apparatus (second information processing apparatus) (PC) 301 can exchange commands and various data with an image forming apparatus (first information processing apparatus) (MFP) 302 via a network 303. The PC 301 corresponds to the PC described with reference to FIGS. 1 and 2, and the MFP 302 corresponds to an MFP to be described with reference to FIG. 4.

Figure 4:
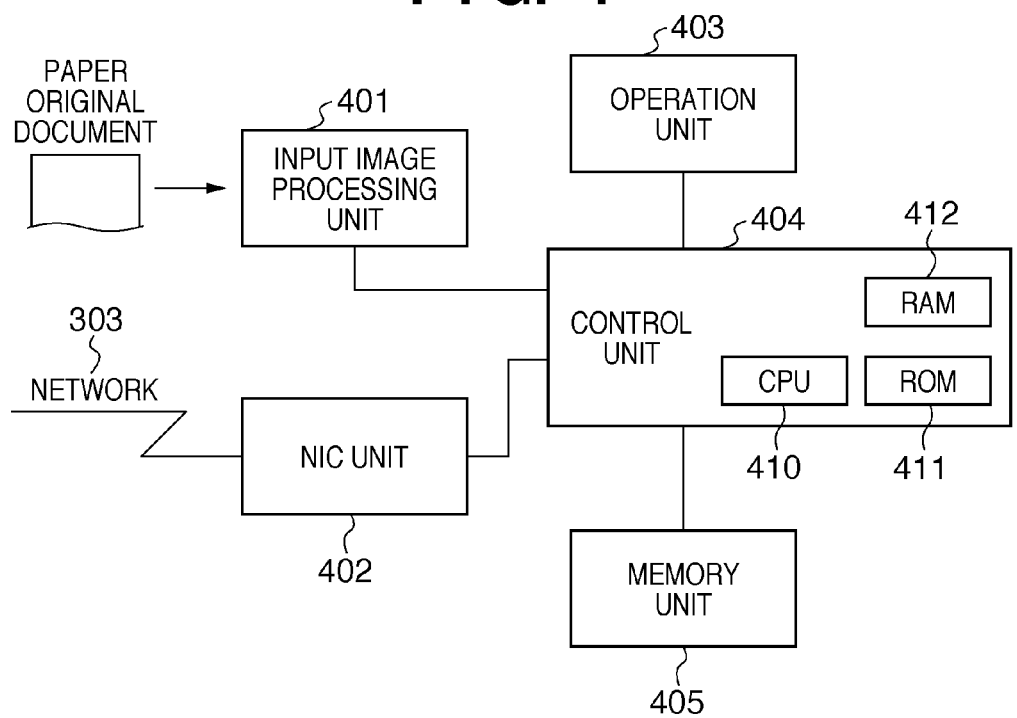
FIG. 4 is a block diagram showing the schematic arrangement of an image forming apparatus (MFP) according to the embodiment.

FIG. 4 is a block diagram showing the schematic arrangement of the image forming apparatus (MFP) 302 according to the embodiment.

A NIC unit 402 transmits a transmission setting controlled by a control unit 404 to the PC 301 via the network 303, or transfers a transmission setting received from the PC 301 to the control unit 404. An operation unit 403 displays a transmission setting in the MFP 302 and allows to validate the transmission setting. The control unit 404 receives a transmission setting from the operation unit 403 and stores it in a memory unit 405 such as a hard disk. In response to a call from the operation unit 403, the control unit 404 executes transmission processing complying with the transmission setting. When executing transmission processing complying with a registered transmission setting, for example, a scanner scans a paper original document or the like. An input image processing unit 401 processes the scanned image data and temporarily stores it in the memory unit 405. The control unit 404 converts the image data into an image file designated via the operation unit 403, and transmits the image file to the PC 301 via the NIC unit 402 and network 303.

The control unit 404 includes a CPU 410 such as a microcomputer, a ROM 411 which stores programs to be executed by the CPU 410 and various data, and a RAM 412 which provides a work area for storing a variety of data when the CPU 410 executes control processing.

Note that programs to be executed by the control unit 404 may be installed in advance in the memory unit 405, and in execution, read out by the OS and loaded into the RAM 412.

Figure 5:
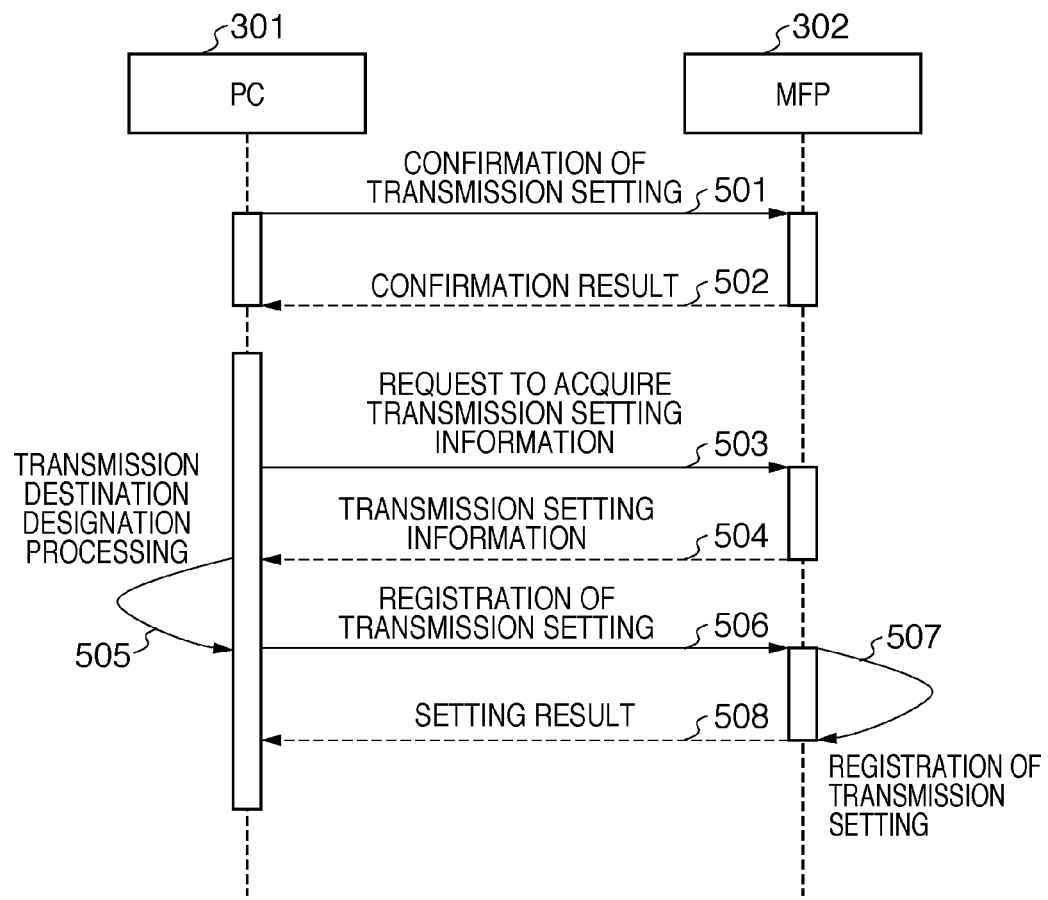
FIG. 5 is a sequence chart for explaining exchange of information between the PC and the MFP in a network according to the embodiment.

FIG. 5 is a sequence chart for explaining exchange of information between the PC 301 and the MFP 302 in the network according to the embodiment. The PC 301 and MFP 302 communicate with each other using a Web service or the like.

In 501, the PC 301 inquires of the MFP 302 whether a transmission setting can be registered. The transmission setting means, for example, setting transmission of data such as an image file stored in the MFP 302 from the MFP 302 to the PC 301 by a remote operation from the PC 301. In 502, in response to the inquiry in 501 from the PC 301 about whether the transmission setting can be registered, the MFP 302 notifies the PC 301 whether the transmission setting can be registered.

Figure 6:
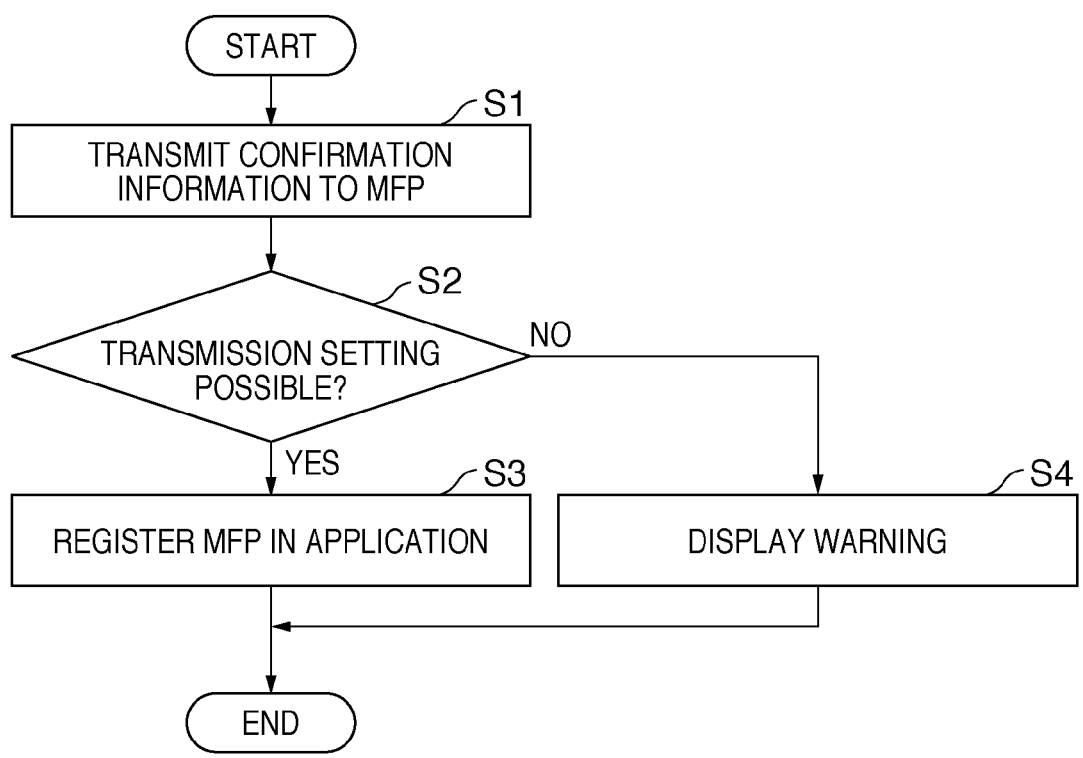
FIG. 6 is a flowchart for explaining processing by the PC according to the embodiment.

FIG. 6 is a flowchart for explaining processing by the PC 301 according to the embodiment. A program for executing this processing is loaded from the HDD 103 into the RAM 102 in execution, and executed under the control of the CPU 101.

In step S1, the PC 301 uses the user interface 201 to transmit confirmation information to the MFP 302 for confirming whether a transmission setting can be registered (501). In step S2, based on information notified from the MFP 302, the PC 301 determines whether the transmission setting can be registered (502). If the PC 301 determines that the transmission setting can be registered, the process advances to step S3 to register the MFP 302 in the registration unit 202 as an MFP capable of registering the transmission setting. If the PC 301 determines in step S2 that no transmission setting can be registered, the process advances to step S4 to display a warning that no transmission setting can be registered.

Figure 7B:
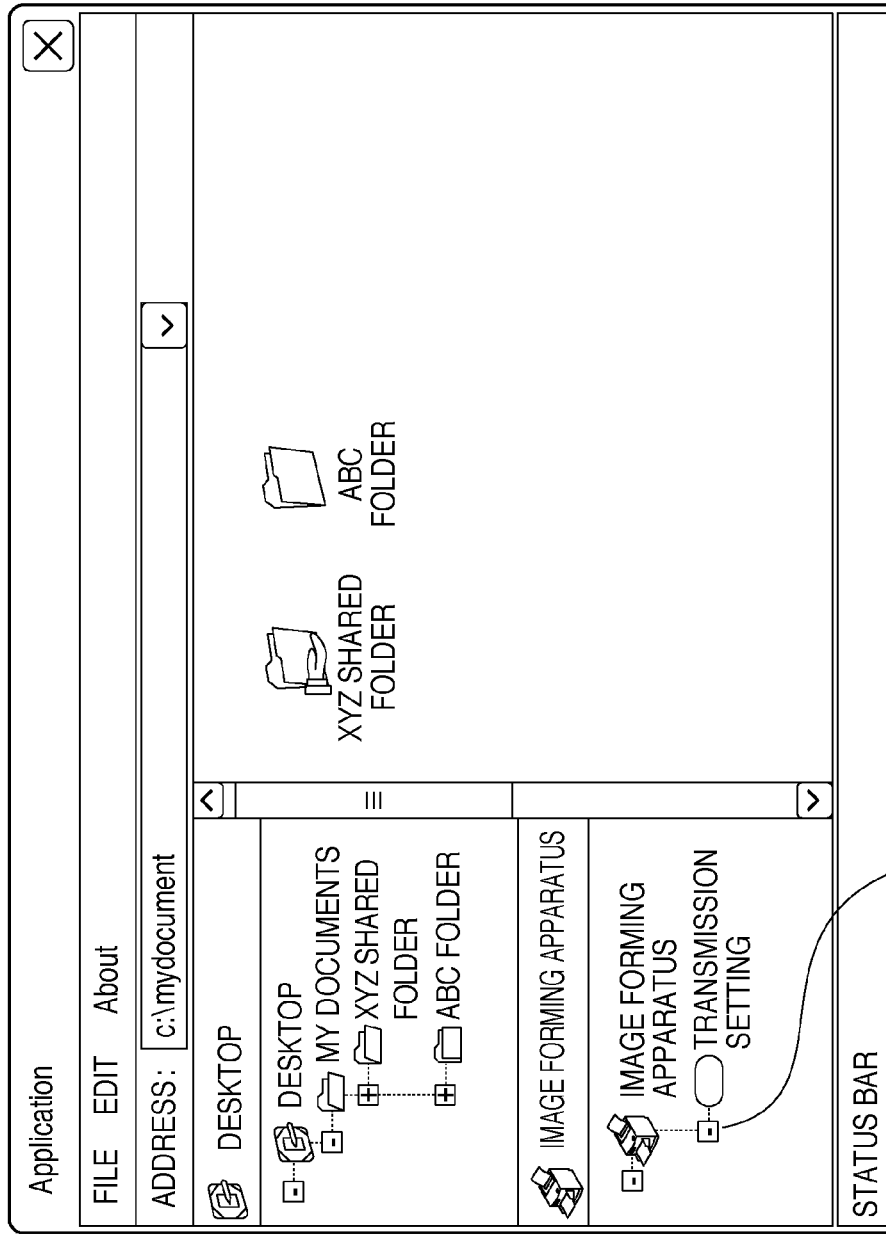

FIGS. 7A and 7B are views exemplifying UI windows displayed on the display unit 107 of the PC 301 according to the embodiment.

FIG. 7A exemplifies a registration menu window for registering an MFP. If the user clicks "register an image forming apparatus" 702 in this window, a dialog 703 pops up. The user inputs an IP address 704 of a target image forming apparatus (MFP) in the dialog 703, and clicks an "OK button" 705. Then, registration processing starts for the image forming apparatus. Transmission setting confirmation information is transmitted to the MFP in 501 of FIG. 5.

FIG. 7B exemplifies a window on the display unit 107 in step S3 of FIG. 6 upon receiving a response from the MFP 302. This window displays an icon 707 so that the user can confirm that the transmission setting has been registered. If no transmission setting can be registered, a warning appears without displaying the icon 707.

In 503 of FIG. 5, the PC 301 requests the MFP 302 to acquire transmission setting information. The MFP 302 transmits the requested transmission setting information to the PC 301 (504). In 505, the PC 301 designates a transmission destination in the transmission setting information. In 506, the PC 301 transmits transmission destination information containing the designated transmission destination to the MFP 302, and requests the MFP 302 to register it. Upon receiving the registration request, the MFP 302 registers the designated transmission destination in the memory unit 405 (507). In 508, the MFP 302 notifies the PC 301 that the transmission destination has been registered.

In this way, the PC 301 can register a transmission setting in the MFP 302 to transmit an image file or the like to a desired transmission destination.

Figure 8:
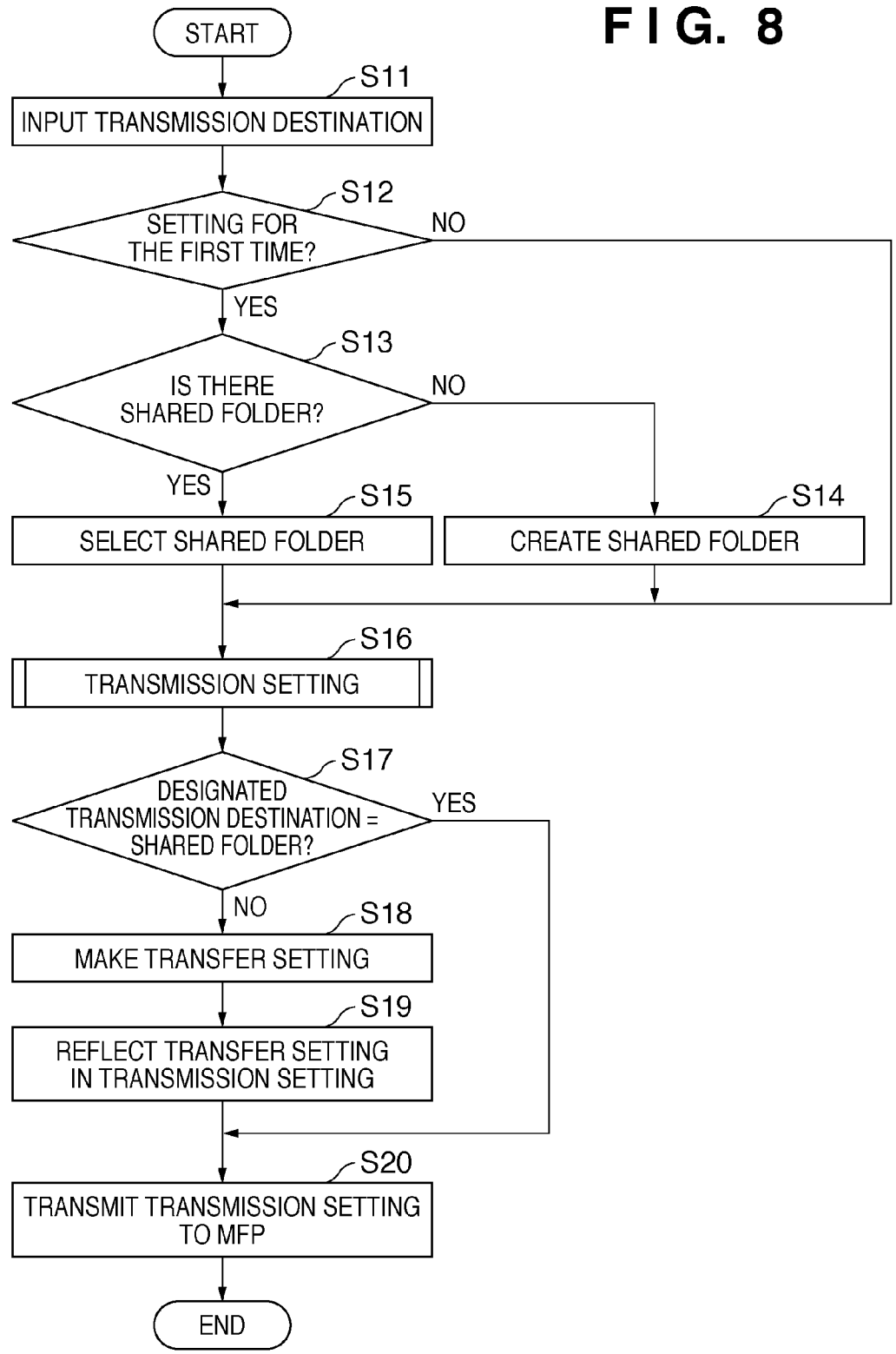
FIG. 8 is a flowchart for explaining processing of registering a transmission setting in the MFP by the PC according to the embodiment.

FIG. 8 is a flowchart for explaining processing of registering a transmission setting in the MFP by the PC 301 according to the embodiment. A program for executing this processing is loaded from the HDD 103 into the RAM 102 in execution, and executed under the control of the CPU 101. This sequence starts when the user drags and drops the icon 707 to an "XYZ shared folder" or "ABC folder" in the window shown in FIG. 7B.

In step S11, the application 200 inputs the transmission destination of an image file transmitted from the MFP 302 that is designated via the user interface 201. The process advances to step S12 to determine whether registration of the transmission setting in a selected MFP (MFP corresponding to the icon 707) is requested for the first time. If it is determined that the registration is requested for the first time, the process advances to step S13 to determine whether a shared folder is set in the PC 301. To transmit an image file from the MFP 302 to a folder in the PC 301, the folder serving as the transmission destination needs to be shared so that both the MFP 302 and PC 301 can access the folder. In step S13, it is determined whether there is a shared folder (i.e., shared folder available as an image file transmission destination).

If the registration is not requested for the first time, the process shifts to transmission setting processing in step S16. In step S12, whether registration of the transmission setting is requested for the first time is determined based on whether a button control ID has been saved in the application 200. Creation of the button control ID will be described later with reference to the flowchart of FIG. 9.

If it is determined in step S13 that at least one shared folder exists, the process advances to step S15 to prompt the user via the user interface 201 to select a shared folder used as an image file transmission destination. If there is only one shared folder, it may be automatically set without displaying the shared folder on the user interface 201. If it is determined in step S13 that no shared folder exists, the process advances to step S14 to automatically create a shared folder. In the shared folder creation processing, the application 200 confirms the authority of the OS. If the OS has an authority to create a shared folder, the application 200 changes the setting to share a folder designated via the user interface 201. If the OS does not have an authority to create a shared folder, the application 200 displays a warning that no transmission destination can be designated. After executing step S14 or S15, the process advances to step S16 to register the transmission setting.

Figure 9:
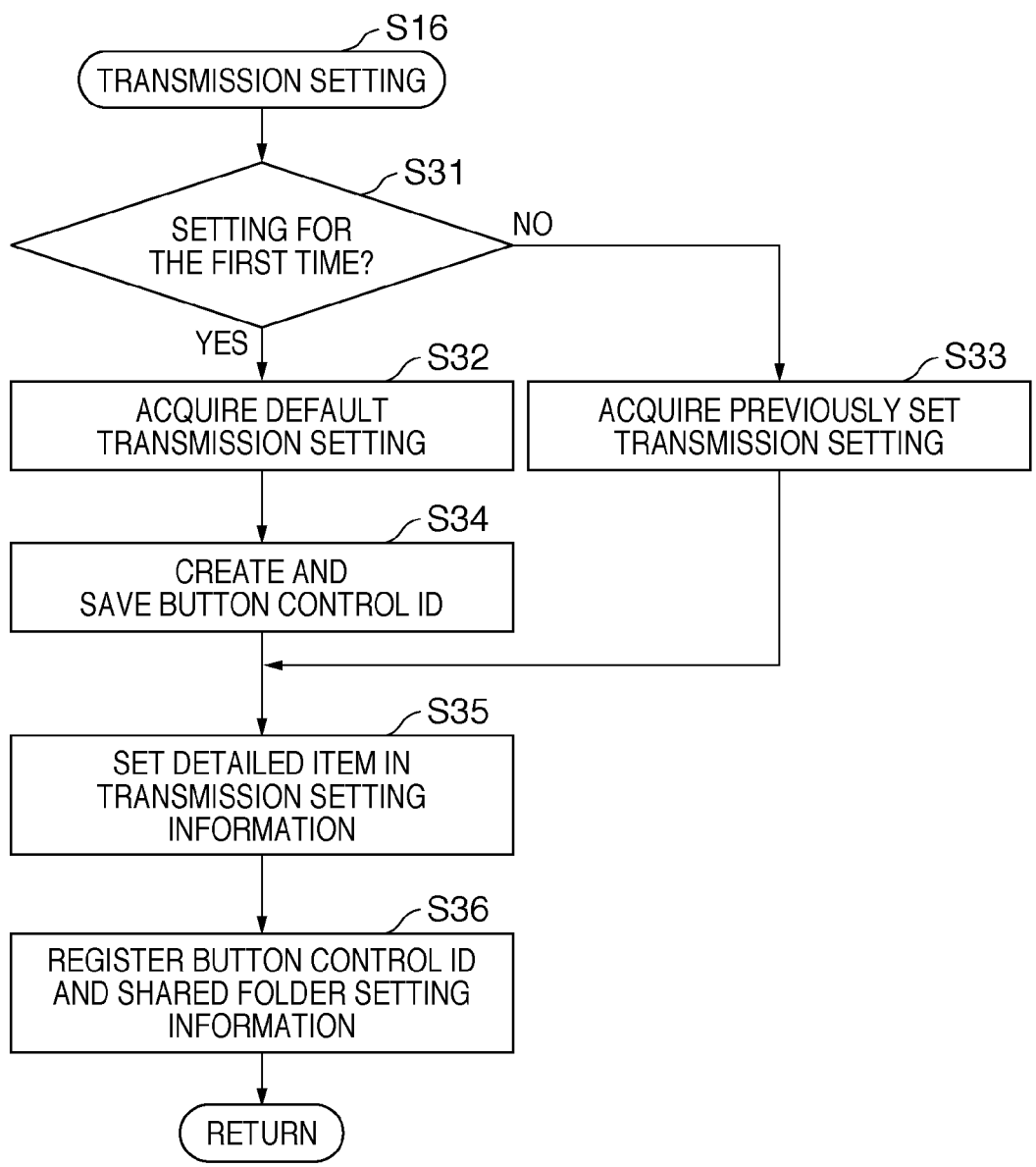
FIG. 9 is a flowchart for explaining transmission setting processing in step S16 in the flowchart of FIG. 8.

FIG. 9 is a flowchart for explaining the transmission setting processing in step S16 in the flowchart of FIG. 8.

In step S31, similar to step S12, it is determined whether registration of the transmission setting in a selected MFP is requested for the first time. If the registration is requested for the first time, the process advances to step S32, and the MFP 302 acquires default transmission setting information. The process then advances to step S34 to create a button control ID and save it in the HDD 103. The button control ID is a UUID for identifying a transmission setting to be registered in the MFP 302. The process advances to step S35, and the user interface 201 sets, in the acquired transmission setting information, detailed items to be set in the transmission setting, such as the user name and password of the PC 301. The process advances to step S36, and the application 200 registers the button control ID and shared folder information in the transmission setting information.

If it is determined in step S31 that the registration is not requested for the first time, the process advances to step S33. By using a button control ID stored in the PC 301 after setting, transmission setting information corresponding to the button control ID is acquired from the MFP 302. After that, the process advances to step S35.

Referring back to FIG. 8, the process advances to step S17 to determine whether the transmission destination (i.e., the folder to which the icon 707 has been dropped) designated in step S11 is identical to the set shared folder (i.e., the folder selected in step S15). If the designated transmission destination is identical to the set shared folder, the process advances to step S20 to directly transmit the transmission setting to the MFP 302 without changing it.

If it is determined in step S17 that the designated transmission destination is different from the set shared folder, the process advances to step S18 to automatically make a transfer setting. In step S18, the application 200 makes a setting of automatically transferring, to the folder designated in step S11, an image file transmitted to the shared folder set in step S15. According to this setting, the application 200 transfers a file transmitted from the MFP 302.

Figure 10B:
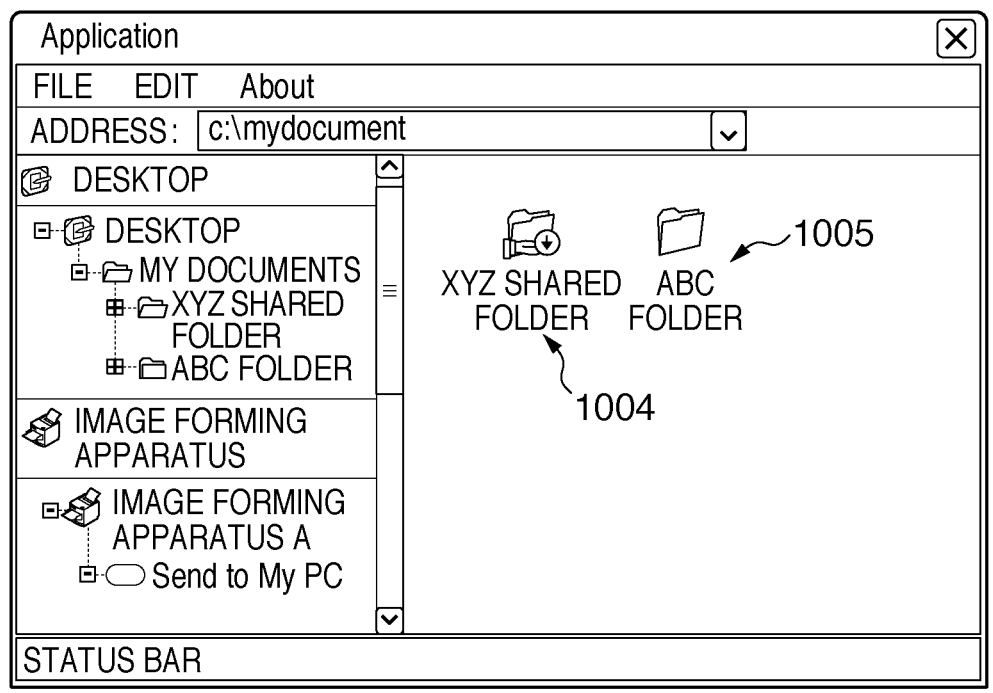

The process advances to step S19 to reflect, in the transmission setting, transfer destination information contained in the transfer setting. In the embodiment, information representing a transfer destination is added as the name of a send button displayed on the MFP 302. However, the position of the information is not limited to the name of the send button as long as the information can be displayed on the operation unit 403 of the MFP 302. Thereafter, the process advances to step S20 to transmit the information-reflecting transmission setting to the MFP 302. The MFP 302 generates an operation button which designates the transmission destination, and displays the transfer destination information as the name of the operation button. FIGS. 10A and 10B are views exemplifying the UI of the PC 301 that is set according to the flowchart of FIG. 8.

In a window 1010 of FIG. 10A, an XYZ shared folder 1001 and ABC folder 1002 are managed in the HDD 103. Assume that the MFP 302 can access the XYZ shared folder 1001 via the network interface 105. Also assume that the user designates the ABC folder 1002 as a transmission destination (he drops the icon 707 to the ABC folder). In this UI example, only one XYZ shared folder 1001 is shared and thus set as the transmission destination of an image file from the MFP 302 (step S15).

In a window 1011, the user designates image forming apparatus A (corresponding to the MFP 302) on the screen of the display unit 107 and associates image forming apparatus A with the ABC folder 1002. Then, a send button creation dialog 1003 appears. In the dialog 1003, the user inputs detailed settings necessary to set a send button (step S35 in FIG. 9). A default transmission setting acquired in step S32 is reflected in the dialog 1003 and displayed. If there is no default transmission setting, each item in the dialog 1003 is blank.

In step S17, it is determined that the designated transmission destination (ABC folder 1002) is different from the set shared folder (XYZ shared folder 1001). Hence, it is set to transfer an image file from the XYZ shared folder to the ABC folder (S18). This transfer setting is to automatically transfer, to the ABC folder 1002, an image file input from the MFP 302 to the XYZ shared folder 1001. After setting the transfer destination, the transfer destination setting information is reflected in the transmission setting of the MFP 302.

FIG. 10B is a view exemplifying a UI display when the XYZ shared folder is set as a transfer destination.

In the embodiment, a send button is created by assigning the folder name of a transfer destination as the send button name of the MFP (S19). Transmission setting information containing the folder name of the transfer destination is transmitted to the MFP 302 (S20), creating a send button. An icon of a shared folder 1004 in FIG. 10B is an example of display control representing that the shared folder is set as a transfer destination. An icon of an ABC folder 1005 indicates that the folder is actually set as a transmission destination.

Figure 11:
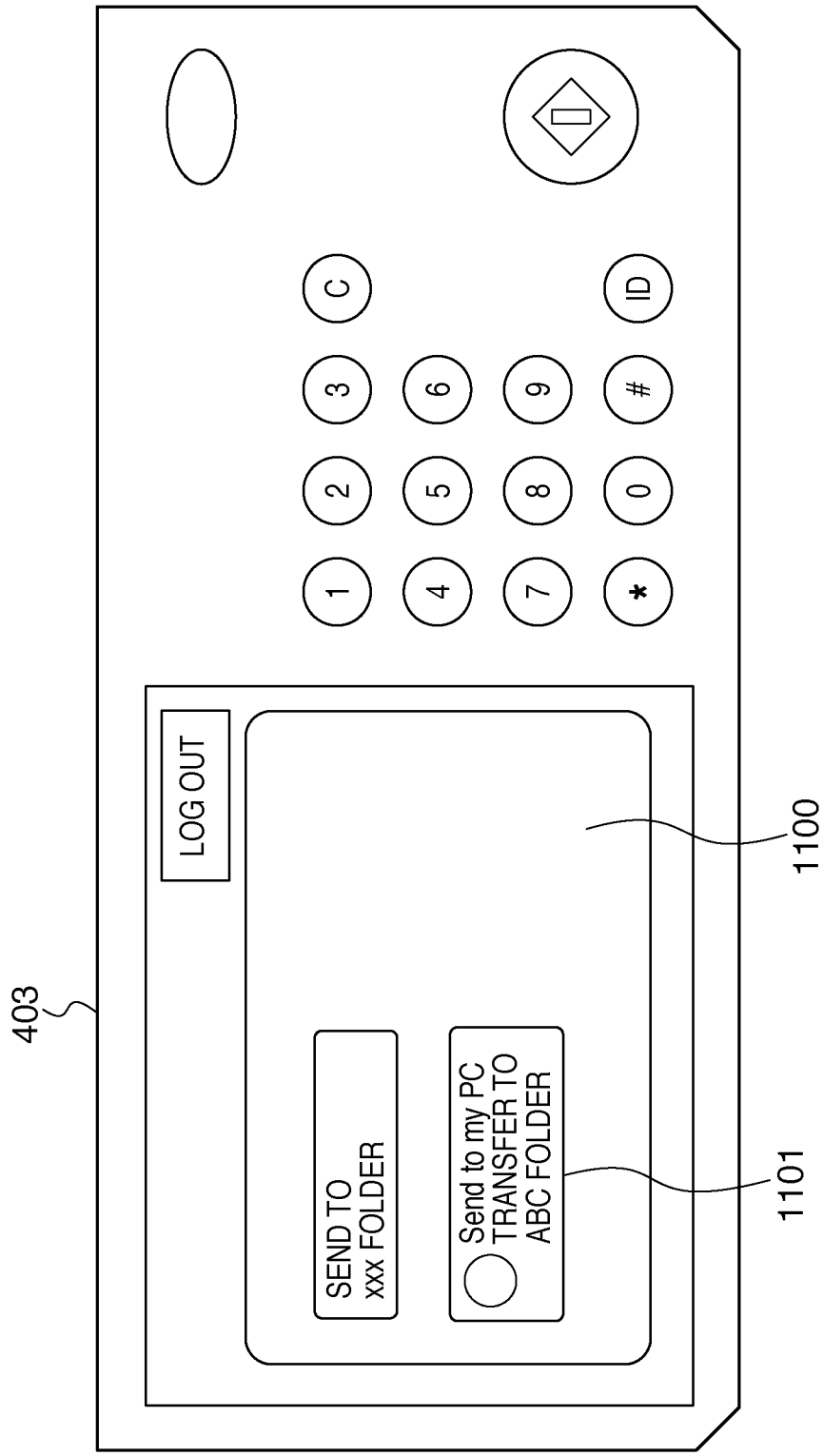
FIG. 11 is a view exemplifying a UI displayed on the operation unit of the MFP according to the embodiment.

FIG. 11 is a view exemplifying a UI displayed on the operation unit 403 of the MFP 302 according to the embodiment.

A display unit 1100 of the operation unit 403 displays a transmission destination button 1101. The transmission destination button 1101 presents a transfer destination "send to the ABC folder". Even when an image file transmitted to the shared folder (XYZ shared folder 1004) of the PC 301 is further transferred to another storage location (ABC folder), the user of the MFP 302 can recognize the transfer destination (ABC folder) of the image file. When it is set to transfer an image file to a storage location the user of the MFP 302 does not intend, it is possible to stop transmission of an image file from the MFP 302 to the PC 301 or carefully select image files so as to permit transfer of them.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-048273, filed Mar. 2, 2009, which is hereby incorporated by reference herein in its entirety.

What is claimed is:

1. An information processing system comprising:
a registration unit which registers, on an information processing apparatus, a transmission destination to which data is to be transmitted; and
a display control unit which, when the transmission destination registered by said registration unit has a transfer setting which causes the transmitted data to be transferred to a transfer destination, causes the information processing apparatus to display, in association with a button for transmission to the transmission destination, information representing the transfer destination.

2. The system according to claim 1, further comprising a designation unit which designates a storage location of the data in accordance with a user operation,
wherein the transfer setting is a setting for transferring the data transmitted to the transmission destination to the storage location designated by said designation unit.

3. The system according to claim 2, wherein when the storage location designated by said designation unit is different from the transmission destination registered by said registration unit, said display control unit causes the information processing apparatus to display information representing the storage location instead of information representing the transmission destination.

4. The system according to claim 2, further comprising a transfer setting unit which automatically makes the transfer setting when the storage location designated by said designation unit is different from the transmission destination registered by said registration unit.

5. The system according to claim 2, wherein said designation unit designates the storage location which is a folder managed by a second information processing apparatus.

6. The system according to claim 2, wherein said registration unit registers the transmission destination which is a shared folder managed by a second information processing apparatus and accessible by both the information processing apparatus and the second information processing apparatus.

7. The system according to claim 6, further comprising:
a determination unit which, when said designation unit designates the storage location, determines whether a shared folder available as the transmission destination exists; and
a generation unit which, when said determination unit determines that a shared folder available as the transmission destination does not exist, automatically generates a shared folder to be used as the transmission destination.

8. The system according to claim 1, further comprising a notification unit which notifies the information processing apparatus of the information representing the transfer destination,
wherein said display control unit arranged in the information processing apparatus controls a display unit of the information processing apparatus to display the information which is notified by said notification unit and represents the transfer destination.

9. The system according to claim 8, wherein said display control unit controls the display unit to display the information representing the transfer destination as a button name of the button operated when a user designates transmission of the data.

10. The system according to claim 9, further comprising:
a reading unit which reads an image of an original document to generate image data based on the image, on the information processing apparatus; and
a transmission unit which transmits the image data generated by said reading unit to the transmission destination registered by said registration unit in response to operating the button displayed on the display unit.

11. A method of controlling an information processing system, comprising:
registering, on an information processing apparatus, a transmission destination to which data is to be transmitted; and
when the transmission destination registered in said registering has a transfer setting which causes the transmitted data to be transferred to a transfer destination, causing the information processing apparatus to display, in association with a button for transmission to the transmission destination, information representing the transfer destination.

12. A non-transitory computer-readable storage medium storing a program for causing a computer to execute an information processing system control method defined in claim 11.

* * * * *